United States Patent [19]

Thiry

[11] 4,112,834
[45] Sep. 12, 1978

[54] FOOD PROCESSING APPARATUS

[76] Inventor: Geza A. Thiry, 6204 Washington St., Ravenna, Ohio 44266

[21] Appl. No.: 650,558

[22] Filed: Jan. 19, 1976

[51] Int. Cl.$^2$ ............................................. A23P 1/00
[52] U.S. Cl. ................................... 99/450.1; 99/494; 83/121; 83/406.1; 118/15; 198/575
[58] Field of Search ............... 99/450.1, 450.4, 450.7, 99/489, 494; 83/707, 409.2, 112, 121, 155, 408, 425.1, 406.1; 425/130, 152 A; 141/160; 198/502, 575; 118/15

[56] References Cited

U.S. PATENT DOCUMENTS

| | | | |
|---|---|---|---|
| 1,817,303 | 8/1931 | Essig | 83/406.1 |
| 3,030,992 | 4/1962 | Picard | 83/408 |
| 3,065,775 | 11/1962 | Keues | 141/160 |
| 3,161,215 | 12/1964 | Werder | 83/121 |
| 3,446,103 | 5/1969 | Foster | 83/155 |
| 3,583,452 | 6/1971 | Muller | 83/155 |
| 3,780,643 | 12/1973 | Papai | 99/450.7 |

*Primary Examiner*—Harvey C. Hornsby
*Assistant Examiner*—Robert Pous

[57] ABSTRACT

An improved apparatus is provided for depositing pepperoni slices which may have a relatively high fat content and grated cheese on a series of pizza pie shells made of pastry. The apparatus includes a main conveyor which is continuously operated to sequentially move pizze pie shells along a path extending through a food processing station. A carriage at the food processing station moves a stick of pepperoni relative to a rotating blade to slice pieces of pepperoni from the stick. A secondary conveyor receives the slices of pepperoni and positively moves the slices of pepperoni toward a pastry shell being moved by the main conveyor. The secondary conveyor includes surfaces which apply forces to opposite sides of the pepperoni slices to grip the slices and positively move them toward the main conveyor. At another food processing station, a body of cheese is sliced into elongated pieces by a grater. A second cutter severs the elongated pieces of cheese into relatively short lengths. The short lengths of cheese are deposited on a pizza pie shell being moved by the main conveyor. The bodies of cheese are advantageously gripped between a pair of walls which are movable to release the body of cheese after each slicing operation so that the body of cheese can fall by gravity into correct position for a next succeeding slicing operation. The pepperoni and cheese processing apparatus can be used either separately or together in making a pizza or other food.

19 Claims, 9 Drawing Figures

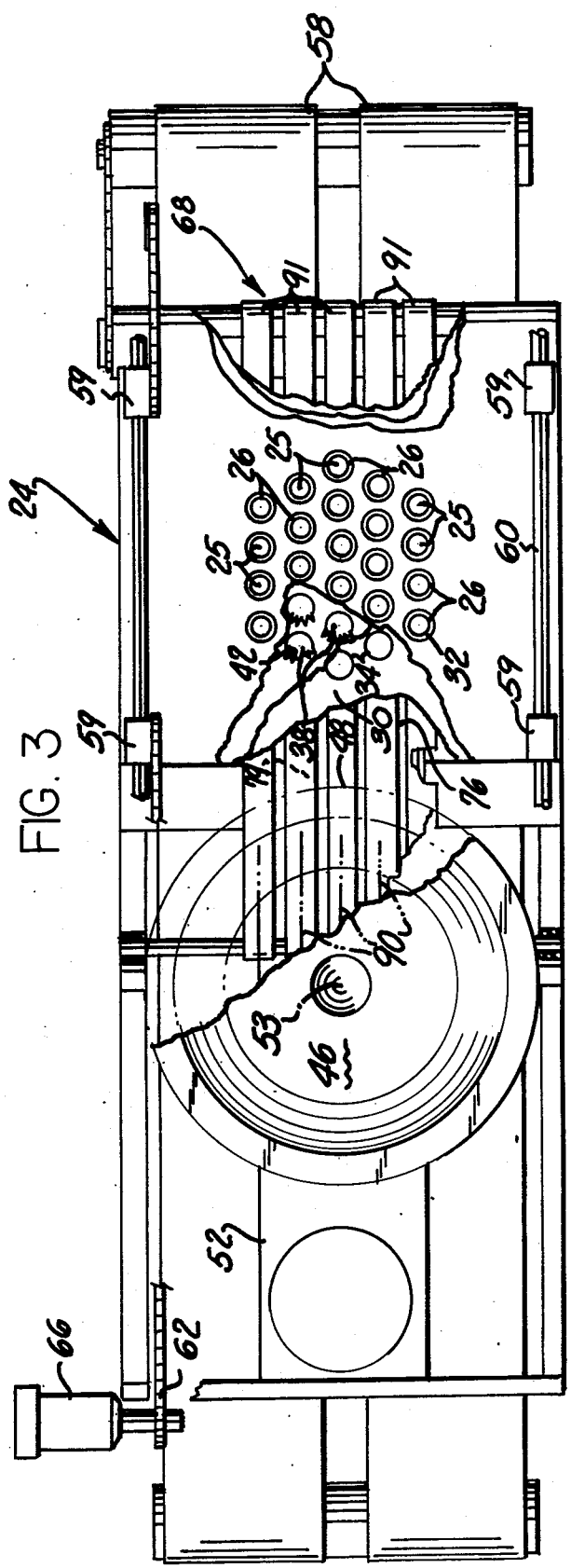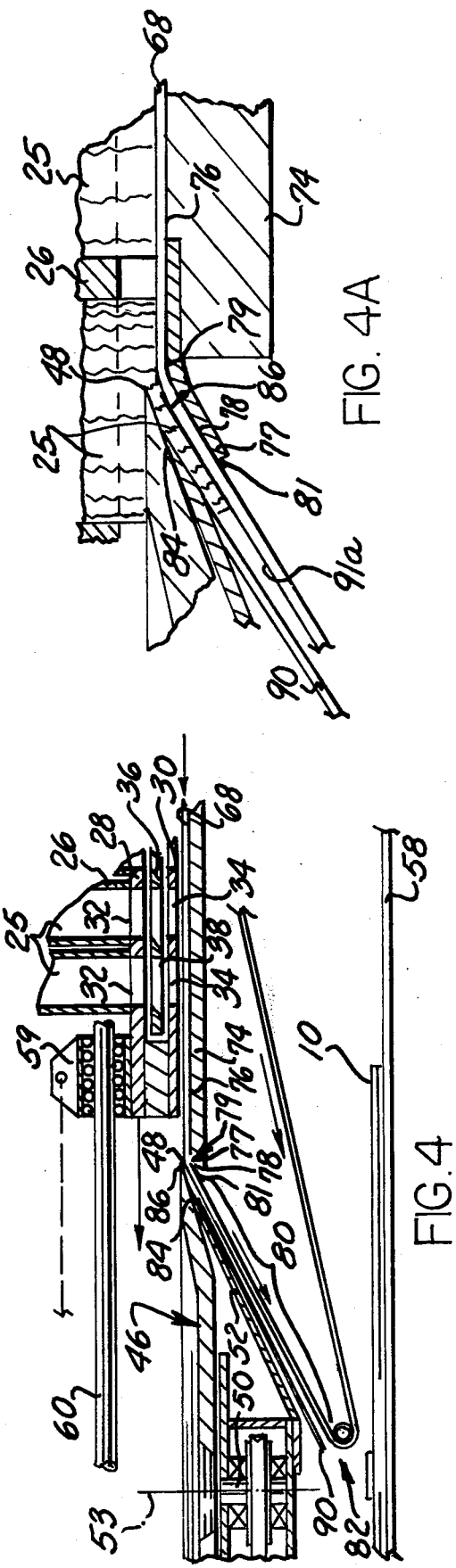

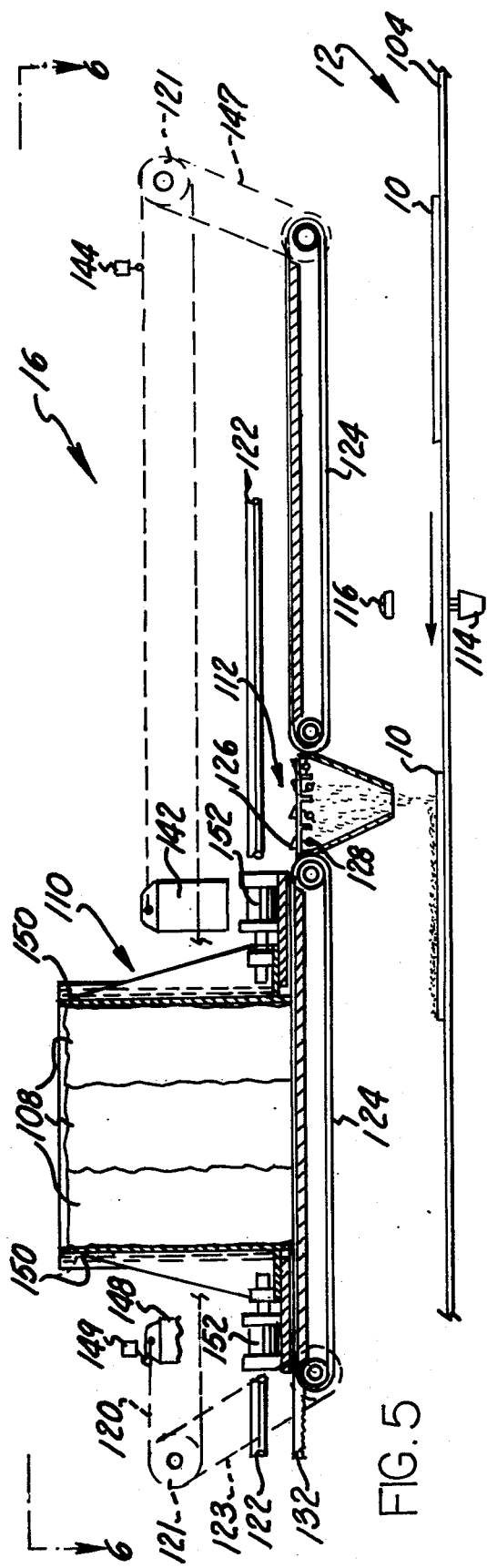
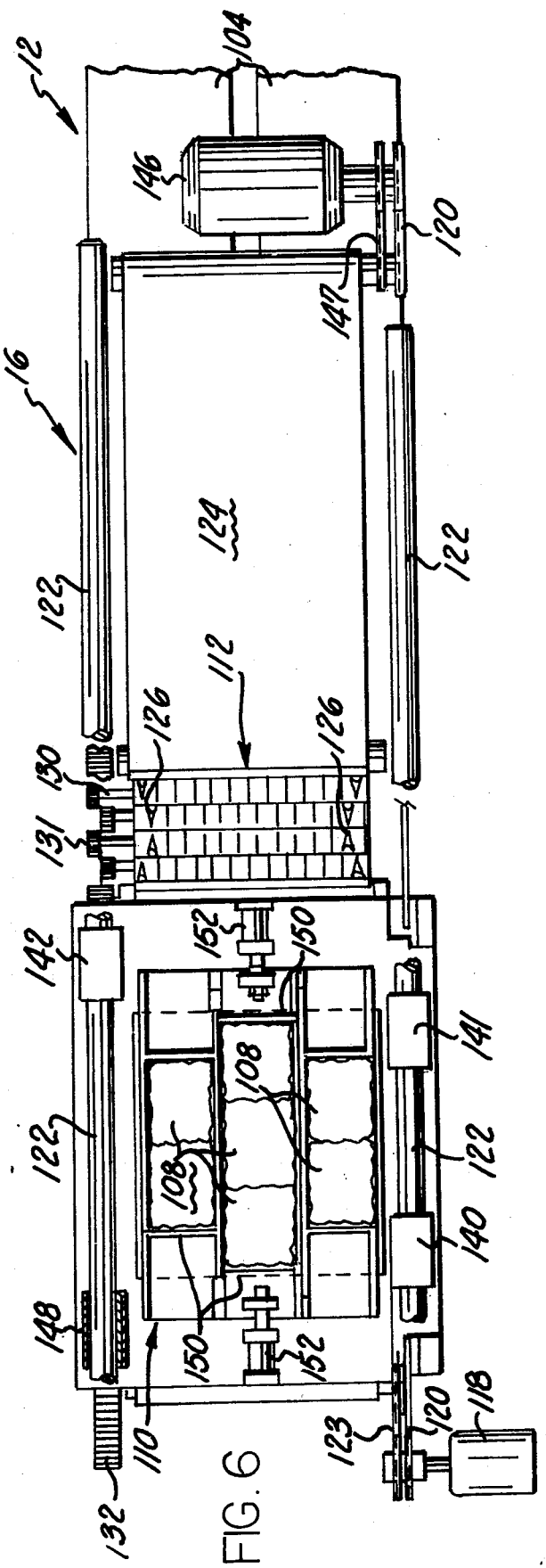
FIG. 5
FIG. 6

FOOD PROCESSING APPARATUS

BACKGROUND OF THE INVENTION

The present invention relates generally to apparatus for associating one or more foodstuffs with a pastry shell. More particularly, the present invention relates to apparatus for associating a foodstuff such as pepperoni or cheese with a pizza pie shell.

A known apparatus designed for the automatic assembling of pizza pies is disclosed in U.S. Pat. No. 3,780,643. According to the basic concept of that patent, a conveyor is intermittently driven to sequentially index pastry shells to each of a plurality of food processing stations at which an appropriate foodstuff (e.g. tomato sause, pepperoni, cheese) is associated with the pastry shell. In the associating of pepperoni with the pastry shell a plurality of bodies of pepperoni and a cutting blade are movable relative to each other in order to sever pieces of the pepperoni from the pepperoni bodies. A chute is provided for receiving the slices of pepperoni which slide along the bottom of the chute and are discharged onto the pastry shell.

Experience has shown that with pepperoni of a relatively low fat content a system such as shown in U.S. Pat. No. 3,780,643 is generally capable of associating pepperoni slices with the pastry shells in its intended manner. However, with pepperoni of relatively high fat content, and commercially available pepperoni has, in fact, been tending to have a high fat content, the pepperoni slices tend to get jammed in the chute after a short period of operation. This is because the high fat content of the pepperoni results in a high frictional engagement between the pepperoni slices and the surface of the chute. After short periods of time the pepperoni slices begin to stick to the surface of the chute. This has meant that a system such as disclosed in U.S. Pat. No. 3,780,643 has not been found satisfactory for associating slices of pepperoni having a high fat content with a pizza pie shell.

Additionally, in the system disclosed in U.S. Pat. No. 3,780,643, after a slice of pepperoni has been cut from next to the end of a stick of pepperoni, the remaining or butt end piece of pepperoni may have a thickness which is less than the designed thickness of a slice of pepperoni. This thin piece of pepperoni cannot be gripped and in sliding between the various plates may jam the pepperoni station. In fact, during operation of a pepperoni station constructed in accordance with U.S. Pat. No. 3,780,643 for an extended period of time, the leftover pepperoni slices have jammed the pepperoni station to such an extent that the pepperoni processing equipment was inoperative.

Also disclosed in U.S. Pat. No. 3,780,643 is a food processing station at which cheese is designed to be automatically grated and deposited on a pastry shell which has been indexed to a position below the grater. Bodies of cheese are vertically supported between the walls of a holder with their bottom edges resting on a fixed planar surface. Movement of the cheese holder slides these bottom edges along the fixed planar surface and into engagement with a series of cusps for grating the cheese. The holder is then returned to its original position and depends upon the bodies of cheese falling by gravity to bring their bottom edges in engagement with the planar surface.

Experience has further shown, however, that such a cheese grating station often does not function for long periods of time in its intended manner. The dragging of the cheese along the planar surface creates a retarding frictional force against that lower end portion of the cheese. This retarding force urges the cheese body against at least one of the vertical walls of the holder. The cheese body thus develops a high frictional engagement with the vertical walls of the holder and this frictional engagement sometimes resists falling of the cheese by gravity into correct position against the planar surface.

SUMMARY OF THE PRESENT INVENTION

The present invention provides an apparatus for associating a sliced foodstuff or high fat content (e.g., pepperoni) with a series of pastry shells for an extended period of time without jamming. In one aspect of the invention, a main conveyor is designed to sequentially move pastry shells along a path extending through a food processing station. At the food processing station, a blade and body of foodstuff, such as pepperoni, are moved relative to each other to sever pieces of the foodstuff from the body. A secondary conveyor is provided to receive severed pieces of the foodstuff and to move the severed pieces of the foodstuff toward a location at which the severed pieces of the foodstuff are associated with a pastry shell being moved by the main conveyor. The secondary conveyor includes surface means for applying a force to the severed pieces of the foodstuff to positively move the severed pieces of foodstuff. Due to the positive movement of the severed pieces of foodstuff by the secondary conveyor, slices of a foodstuff having a high fat content can be processed for an extended period of time even through the high fat content causes the pepperoni slices to tend to stick to the apparatus.

In additional features of the invention the severed pieces of foodstuff are positively gripped and urged against the surface means of the second conveyor before the pieces of foodstuff have been fully severed from the foodstuff body. In yet a further aspect of the invention the associating of the slices of foodstuff with the pastry shell is effected while the pastry shell is being continuously moved through the food processing station by the first conveyor.

In another aspect of the present invention there is provided apparatus for grating foodstuff (e.g. cheese) and for associating the grated foodstuff with a pastry shell, which apparatus is not believed subject to the problems outlined above with respect to the apparatus of U.S. Pat. No. 3,780,643. The bottom edge of the body of foodstuff is maintained in substantially constant contact with a moving conveyor surface as it approaches a grater, thus avoiding the undesirable effects which may result from frictional contact between the foodstuff and a fixed planar surface. In addition, the foodstuff support is designed to positively release wall portions thereof from contact with the body of foodstuff at appropriate periods of operation to ensure that the foodstuff body can fall by gravity into correct position for subsequent movement into contact with the grater.

When the cheese is cut from the body of cheese by the grater, the cheese tends to form relatively long strings having an unsatisfactory appearance. Accordingly, secondary cutters are provided to cut the elongated pieces of cheese into relatively short pieces which are visually appealing.

In yet additional aspects of the present invention the apparatus for slicing pieces of a foodstuff and for associating the sliced pieces with a pastry shell and the apparatus for grating a foodstuff and for associating the grated foodstuff with a pastry shell are designed to be operated for associating their respective types of foodstuff with a continuously moving pastry shell. In the preferred embodiment of the invention apparatus is provided for automatically assembling pizza pie shells through a plurality of food processing stations. At one of the food processing stations apparatus is provided for severing slices of pepperoni from one or more main bodies of pepperoni and for associating the sliced pieces of pepperoni with the pastry shell while the pastry shell is continuously moving through that food processing station. At another food processing station apparatus is provided for grating cheese from a main body of cheese and for associating the grated cheese with the moving pastry shell as the pastry shell is continuously moving through that food processing station.

BRIEF DESCRIPTION OF THE DRAWINGS

These and other objects and advantages of the present invention will become further apparent from the following description taken with reference to the accompanying drawings wherein:

FIG. 3 is a top view, with portions broken away, of the food processing unit of FIG. 2 taken from the direction 3—3;

FIG. 4 is an enlarged sectional view of a portion of the food processing unit;

FIG. 4A is a schematic representation of the cutting of a slice of pepperoni from a stick of pepperoni utilizing the apparatus of FIGS. 2-4;

FIG. 5 is a side sectional view of a cheese grating food processing station according to one preferred embodiment of the present invention;

FIG. 6 is a top view of the apparatus of FIG. 5 taken from the direction 6—6.

DESCRIPTION OF ONE PREFERRED EMBODIMENT OF THE INVENTION

As noted above, the preferred embodiment of the present invention relates to apparatus for use in the automatic assembling of pizza pies. In the description which follows the apparatus according to the present invention is illustrated as incorporated in a pizza pie assembling apparatus. However, from the description which follows the manner in which the principles of the present invention may be applied in associating various forms of foodstuff with a pastry shell will be readily apparent to those of ordinary skill in the art.

Figure 1:
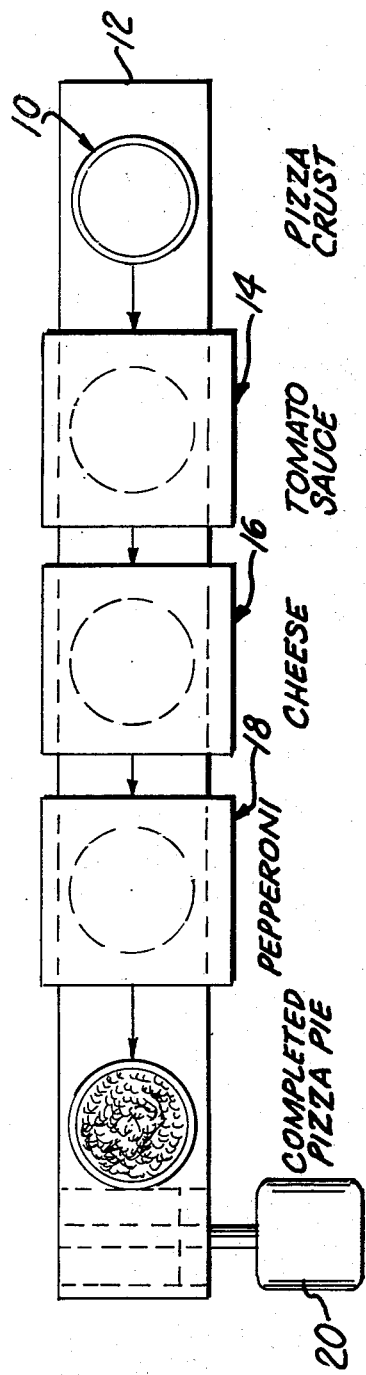
FIG. 1 is a top schematic view of an automatic pizza pie assembling apparatus.

In FIG. 1 there is illustrated the general sequence of events in the automatic assembling of a pizza pie. Pizza crusts or shells 10, are sequentially loaded onto a continuously driven belt of a main conveyor 12. The pizza shells are conveyed through a series of food processing stations (three are shown) in which the various ingredients (foodstuffs) are associated with the pizza shell to form the pizza pie. In the sequence of events shown in FIG. 1 a pizza shell 10 is first conveyed to a tomato sauce applying station 14 whereat a layer of tomato sauce is applied to the top of the pizza shell. The pizza shell then passes through a cheese station 16 and a pepperoni processing station 18 whereat pieces of grated cheese and slices of pepperoni are deposited on the shell. The completed pizza pie is then removed from the conveyor for subsequent freezing and packaging of the pizza pie.

Figure 2:
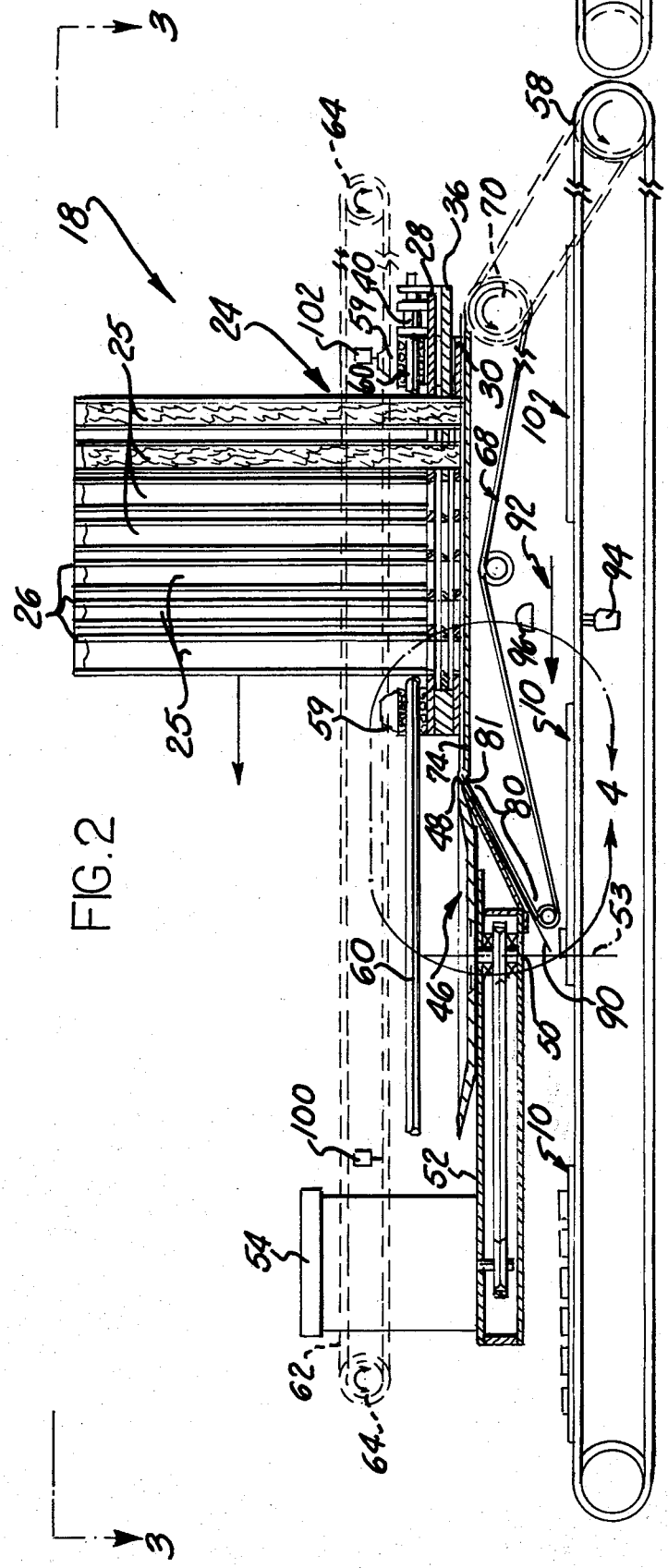
FIG. 2 is a side sectional view of a pepperoni food processing station constructed according to one preferred embodiment of the present invention.

While the conveyor of FIG. 1 schematically shows a single conveyor belt 12 passing beneath all of the food processing stations, it should be noted that the conveyor preferably comprises several interconnected continuous conveyor sections, one of which is shown at 58 in FIG. 2. A first one of the conveyor sections is positively and continuously driven by a motor 20. The other conveyor sections are interconnected for simultaneous continuous movement at the same speed as the driven conveyor section. It should be noted that the use of conveyor sections enables various combinations of food processing stations to be utilized. While several interconnected conveyor sections are preferred the basic principles of this invention can be applied to a system in which a pastry shell is moved through a series of food processing stations by means of a single continuous belt conveyor.

The basic principles of the present invention relate to the application of foodstuffs such as pepperoni and cheese to the pizza shell, and particularly to the application of these foodstuffs to the pizza shell while the pizza shell is being continuously moved through the food processing stations by the conveyor 12. In a pizza pie assembling system, these processing stations are located downstream of an apparatus for applying tomato sauce to the pizza shell. The tomato sauce can be automatically applied to the continuously moving pizza shell by means of one or more stationary fluid dispensing nozzles actuated by means (not shown) for timing dispensing of fluid from the nozzles as the pizza shell is passing thereunder. Another contemplated manner of applying the tomato sauce to the pizza shell is by means of a movable fluid dispensing apparatus actuated for movement by the sensing of the pizza pie at a predetermined location and designed for a predetermined mode of movement relative to the moving pizza pie shell. In fact, for the purposes of this invention, tomato sauce may be manually applied to the pizza shell while the pie shell is moving along the conveyor 12, or may be manually applied before the pie shell is even placed on the conveyor.

FIGS. 2 and 3 illustrate the food processing station 18. First conveyor section 58, forming a part of conveyor 12, conveys the pizza shells 10 along a first path through the food processing station 18.

At the food processing station several sticks (bodies) of pepperoni 25 are supported by a movable carriage 24. The carriage 24 includes a number of vertical tubes 26 each designed to vertically support a stick of pepperoni. The bottom of the movable carriage 24 includes a pair of spaced plates 28, 30 each having aligned holes 32, 34 for passage of the sticks of pepperoni therethrough. Between the spaced bottom plates is a clamping plate 36. The clamping plate 36 is adapted for horizontal movement relative to the carriage for holding the sticks of pepperoni agaist movement while pieces of pepperoni are sliced therefrom. The clamping plate 36 has a plurality of openings 38 which are large enough for the pepperoni sticks to pass therethrough. When the clamping plate 36 is moved relative to the carriage, (under the influence of one or more pneumatic cylinder and piston devices 40) the teeth 42 on the clamping plate 36 impale the pepperoni sticks to clamp the pepperoni stick against movement relative to the carriage during the slicing of pieces from the pepperoni sticks.

Blade means in the form of a rotatable circular knife 46 are provided for slicing pieces of pepperoni from the sticks of pepperoni. The rotatable circular knife 46 includes a cutting edge 48 supported by an axle 50 which is rotatably mounted in a fixed housing 52. A motor 54 is provided to continuously rotate the axle 50 and blade 46. Also, the disposition of the axle 50 in fixed housing 52 means that the axis of rotation 53 of the cutting edge 48 is in a fixed positional relationship with respect to the first conveyor section 58.

The carriage 24 is supported for horizontal movement to bring the bodies of pepperoni into engagement with the rotating cutting edge 48 of the knife. The carriage 24 has support members 59 fixed thereto. Support members 59 slide horizontally on a pair of fixed guides 60. The supports 59 are horizontally driven by means of a chain 62 entrained about a pair of sprockets 64. One sprocket 64 is rotated in either a clockwise or counterclockwise direction by a conventional bi-directional motor 66.

In accordance with one feature of the present invention, a second conveyor 68 is provided to positively move the severed pieces of the pepperoni along a path toward a location at which the severed pieces of pepperoni are associated with a moving pizza shell. The second conveyor 68 is interconnected to conveyor 58 for simultaneous operation therewith at the same speed.

The second conveyor 68 passes over a fixed guide plate 74 having a substantially horizontal surface 76 and an inclined front surface portion 78 which tapers slightly downward from an edge 79 (see FIG. 4). According to the preferred embodiment a plurality of leaf springs 77 are fixed to the guide plate 74 and are bent downwardly to form the inclined front surface portion 78. The front edge 79 of the inclined surface 78 is arcuately shaped (see FIG. 3) and has a curvature generally corresponding to the curvature of the rotating cutting edge 48 of the blade 46. The second conveyor 68 has an inclined run 80 extending from the front edge 81 of the leaf springs 77 downwardly to a location 82 disposed immediately above the conveyor section 58. This inclined portion 80 of the conveyor 68 provides a moving surface which engages the severed pieces of pepperoni and applies a force to the severed piece to positively move them down the inclined run 80 to the location 82 at which they are deposited on the moving pizza shell.

The second conveyor 68 also positively engages any butt ends of the pepperoni sticks which have a thickness less than the thickness of a slice of pepperoni, and moves them both horizontally over surface 76 and downwardly along inclined portion 80. This substantially reduces the likelihood of such butt ends jamming the equipment.

Referring to FIGS. 4 and 4A, an inclined surface 84 of the rotating knife 46 faces the portion of the second conveyor 68 passing along the inclined front surface 78 formed by leaf springs 77 and forms a nip 86 therewith for receiving the sliced pepperoni. The disposition of the cutting blade 48 above the level of the horizontal run of the second conveyor 68 is such that under normal operation the pepperoni is sliced in pieces which are thicker than the dimension of the nip 86. A slice of pepperoni is guided by the knife surface 84 into the nip 86 before the piece of pepperoni is fully severed from a stick 25 (FIG. 4A).

A series of elongated substantially rigid rods 90 are fixedly supported on the housing 52 and extend generally parallel to the inclined run 80 of the second conveyor 68. According to the preferred emboidment the second conveyor 68 includes a plurality of continuous belts 91, and there is a rigid elongated rod 90 associated with each belt 91. The elongated rods 90 are spaced from the inclined surface of the second conveyor 68 by a distance which is slightly less than the thickness of a slice of pepperoni so that the rods 90 also serve to positively urge the pepperoni slices against the second conveyor 68 along its inclined run 80.

The pepperoni slices are gripped between the conveyor belts 91 and the rods to hold the pepperoni slices against sidewise movement under the influence of the rotating blade 46. In addition, the pepperoni slices are held against sidewise movement by a gripping action applied to the pepperoni slices at the nip 86.

The rods 90 press a pepperoni slice against an upper surface 91a of an associated one of the conveyor belts 91. This pressure results in a firm frictional engagement of the upper surface 91a of the conveyor belt 91 with the bottom surface of the pepperoni slice. However, the rods 90 have a cylindrical outer surface which has a relatively small area of contact with the pepperoni slice. Therefore, the pepperoni slice slides along the rod 90 as the surface 91a of the conveyor belt 91 positively moves the pepperoni slice downwardly toward the main conveyor 12. It should be noted that the downward drive forces applied to the bottom of the pepperoni slice by the upper surface 91a of the conveyor belt 91 enables pepperoni having a relatively high fat content to be utilized without jamming of the apparatus.

Associated with the main conveyor 58 is a sensing means 92 in the form of a light 94 and the photoelectric detector 96, of conventional design. The sensing means 92 senses the leading edge of a pizza shell and in response thereto initiates operation of a carriage drive motor 66 (see FIG. 3) which rotates a drive sprocket 64 to move the chain 62 connected with the carriage. During initial movement of the carriage 24, it accelerates to the same speed as the continuously driven conveyor belts 91. After the carriage 24 has obtained the same speed as the upper surfaces 91a of the conveyor belts 91, the pneumatic piston and cylinder 40 are actuated to move a clamping plate 36 to release the pepperoni sticks 25. This enables the pepperoni sticks 25 to fall downwardly in the tubes 26 so that the bottom or lower end surface of the pepperoni sticks engage the conveyor belts 91. Since the conveyor belts 91 are moving at the same speed as the carriage 24, there is no relative movement between the conveyor belts 91 and the end faces of the pepperoni sticks 25. Once the end faces of the pepperoni sticks 25 have moved into engagement with the conveyor belts, the piston and cylinder assemblies 40 are actuated to move the clamping plate 36 to an engaged position in which teeth 42 on the clamping plate 36 impale the bodies of pepperoni to hold them against movement relative to the tubes 26.

The upper surfaces 91a of the conveyor belts are disposed below the rotating edge of the knife 46 by a distance equal to the desired thickness of a pepperoni slice. Therefore, as the carriage 24 is moved toward the axis of the continuously driven knife 46, slices of pepperoni are severed from the sticks 25 of pepperoni at the nip 86 (see FIG. 4A). As was previously mentioned, the slices of pepperoni are held against sidewise movement under the influence of the knife 46 by the combined influence of the gripping action applied to the pepperoni slices at the nip 86 by the conveyor belt 91 and knife 46 and by the gripping action applied to the pepperoni slices by the rod 90 and conveyor belts 91.

After the carriage 24 has moved the pepperoni sticks past the edge of the rotating knife 46 so that pieces of pepperoni are sliced from all of the vertically supported pepperoni sticks an upstanding support 59 on the carriage engages a limit switch 100 (FIG. 2). Actuation of the limit switch 100 causes the motor 66 to reverse the direction of movement of the carriage 24 and to move the carriage 24 toward the position of FIG. 2. Engagement of the other support 59 with limit switch 102 brakes motor 66 to stop the movement of the carriage. The carriage remains stopped until it is activated by the sensing of a subsequent pizza shell by the sensing means 92. The pneumatic cylinder and piston devices 40 maintain the clamp plate 36 in engagement with the pepperoni sticks to hold them above the surface of the second conveyor 68 until a next succeeding pepperoni slicing operation is undertaken.

The food processing station 16 for associating grated cheese with the moving pizza shell is illustrated in FIGS. 5 through 8. A continuously driven conveyor section 104, which carries the pizza shells through the food processing station 16, forms part of the main conveyor 12. One or more bodies of cheese 108 are supported on a movable carriage 110. The carriage 110 is movable from a rest position shown in FIGS. 5 and 6 in a direction bringing the cheese bodies 108 through a grater or cutting station 112. Movement of the carriage through the grater station 112 is initiated by sensing of a pizza pie shell at a predetermined location along conveyor 104 by means of a light 114 and a conventional photoelectric sensor 116.

The carriage 110 is driven at the same speed as the main conveyor 12 by a bi-directional motor 118 which drives chain 120 entrained about sprockets 121. The carriage is guided for linear movement by guide members 140, 141, 142, 148 which slide on fixed guide bars 122 in a manner similar to the carriage of FIGS. 2 and 3. A pair of conveyors 124 supported below carriage 110 are also driven in either direction and at the same speed as the main conveyor 12 and carriage 110 by bi-directional motor 118. The bodies of cheese 108 are supported in the position shown in FIG. 6 with their lower end surfaces in contact with one of the conveyors 124 and are movable therewith into engagement with the grater section 112.

In the grater section 112 a plurality of rows of cusps 126 are disposed to engage the bottom portions of the bodies of cheese as the carriage moves through the grater section to thereby cut elongated string like pieces 127 (FIG. 8) of cheese from the cheese bodies. Below each row of cusps 126 is a rotatably mounted horizontal axle 130 which supports a series of secondary blades 128, each associated with a respective cusp 126. An end of each axle has a pinion gear 131 fixedly mounted thereto. A rack 132 fixedly carried by the carriage engages and rotates each of the pinion gears 131 as the carriage moves through the grating station.

Figure 8:
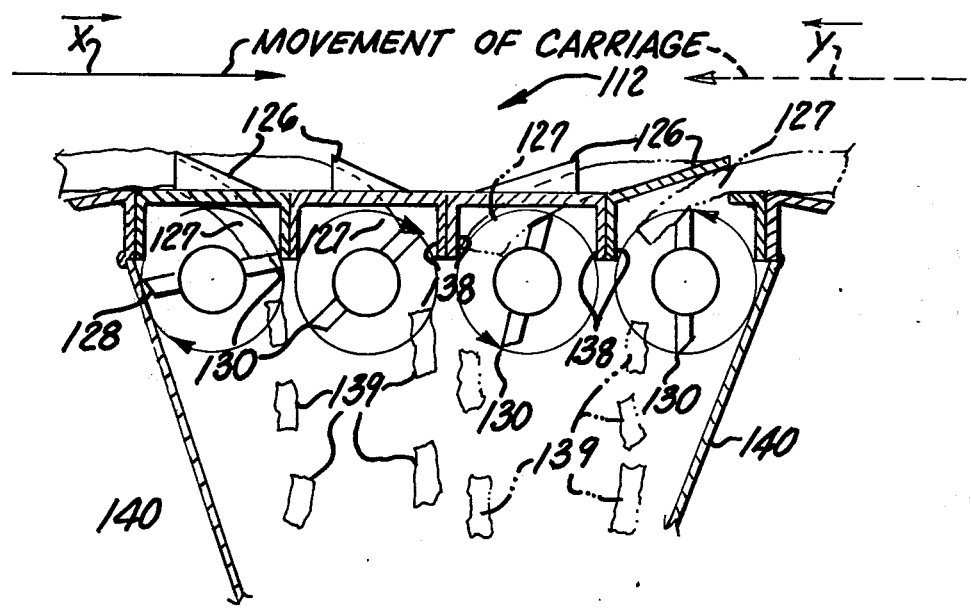

The grating action of the grating section may be appreciated by reference to FIG. 8. When the carriage 110 moves from the position of FIG. 5 through the grater station (in the direction represented in FIG. 8 by arrow $\vec{X}$), a plurality of the cusps 126 sever elongated stringy pieces of cheese 127 from the cheese bodies. These stringy pieces of cheese are then engaged by respective secondary blades 128 which further cut the pieces of cheese against fixed support surfaces 138. The relatively short pieces of cheese 139 are then guided by a pair of inclined members 140 onto a moving pizza shell 10.

Assuming the carriage is at rest in the position of FIG. 5, the sensing of a pizza shell actuates motor 118 which drives both the carriage 110 and both conveyors 124 in a first direction at the same speed. Motor 118 is preferably designed to move carriage 110 and conveyors 124 at the same speed as conveyor section 104 is being driven. The carriage 110 moves through the grating section in timed relation to the movement of the pizza shell 110 so that the grated cheese is deposited on the moving pizza shell. The carriage thereafter continues moving until guide member 142 engages limit switch 144 which deenergizes motor 118 and energizes brake motor 146 to stop the movement of carriage 110 and both conveyors 124. Sensing of the next successive pizza shell 10 energizes motor 118 to drive the carriage and the conveyors 124 for movement in a reverse direction so that the carriage is driven through the grater station 112 in a reverse direction (shown by arrow Y in FIG. 8).

Figure 7:
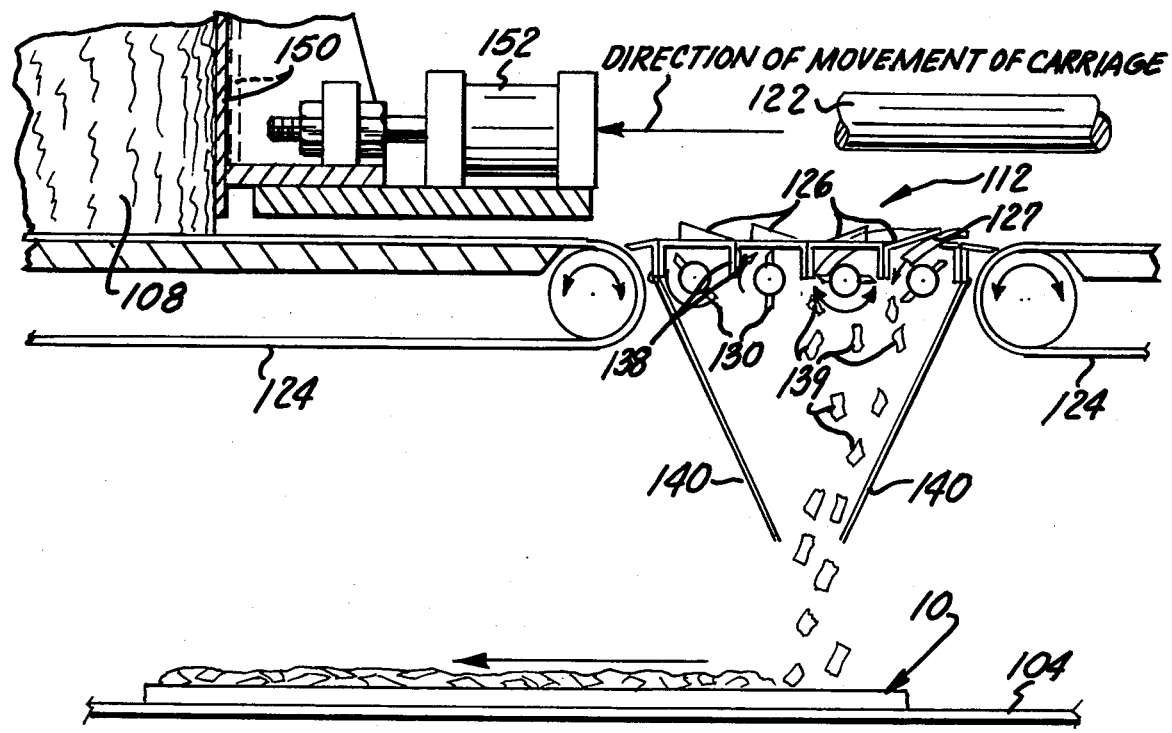
FIGS. 7 and 8 illustrate the grating action of the various elements in the grating of cheese according to the present invention.

In the grater section 112 several rows of cusps 126 are disposed to engage the cheese when the carriage is driven in the reverse direction to thereby effect severing of stringy pieces of cheese from the cheese bodies 108. The secondary blades 128 disposed thereunder further sever the stringy pieces and these further severed pieces are then guided onto the moving pizza shell. The grating of pieces of cheese as the carriage is moved in the reverse direction is shown in FIG. 7. The carriage 110 then continues onto the position of FIG. 5 at which guide member 148 engages the limit switch 149 and energizes brake motor 146 to stop the carriage. The carriage remains at rest until it receives a signal from another pizza shell passing between the photoelectric sensor and the light.

In an additional aspect of this invention of a pair of spaced vertical walls 150 disposed substantially normal to the path of movement of the carriage support two of the ends of the cheese bodies. The walls 150 are connected to respective double acting air cylinders 152. Each air cylinder 152, when actuated, is adapted to move its respective wall 150 linearly away from and, after a short delay, back toward the cheese bodies. Actuation of either limit switch 144, 149 also actuates both air cylinders 152 to pull the walls 150 slightly away from the cheese bodies (to the positions shown in dashed lines in FIG. 5) and after a short pause to move the walls back to their initial position. This substantially reduces the area of wall contact with the cheese for a short period of time, and thereby insures that the cheese bodies drop under the influence of gravity onto a respective conveyor 124.

In view of the foregoing it is apparent that the present invention provides an apparatus for associating a sliced foodstuff of high fat content (e.g., pepperoni) with a series of pastry shells for an extended period of time without jamming. In one aspect of the invention, a main conveyor 12 is designed to sequentially move pastry shells 10 along a path extending through a food processing station 18. At the food processing station, a blade 16 and body of foodstuff 25 such as pepperoni are moved relative to each other to sever pieces of the foodstuff from the body. A secondary conveyor 68 is provided to receive severed pieces of foodstuff and to move the severed pieces of the foodstuff toward a location at which the severed pieces of the foodstuff are associated with a pastry shell 10 being moved by the main conveyor 12. The secondary conveyor includes surface means 91a for applying a force to the severed pieces of the foodstuff to positively move the severed pieces of foodstuff. Due to the positive movement of the severed pieces of foodstuff by the secondary conveyor 68, slices of a foodstuff having a high fat content can be processed for an extended period of time even though the high fat content causes the pepperoni slices to tend to stick to the apparatus.

In additional features of the invention the severed pieces of foodstuff are positively gripped and urged against the surface means 91a of the second conveyor 68 before the pieces of foodstuff have been fully severed from the foodstuff body. In yet a further aspect of the invention the associating of the slices of foodstuff with the pastry shell is effected while the pastry shell is being continuously moved through the food processing station 18 by the first conveyor 12.

In another aspect of the present invention there is provided apparatus for grating foodstuff (e.g. cheese) and for associating the grated foodstuff with a pastry shell, which apparatus is not believed subject to the problems outlined above with respect to the apparatus of U.S. Pat. No. 3,780,643. The bottom edge of the body 108 of foodstuff is maintained in substantially constant contact with a moving surface of a secondary conveyor 124 as the cheese approaches a grater 112, thus avoiding the undesirable effects which may result from frictional contact between the foodstuff and a fixed planar surface. In addition, the foodstuff support is designed to positively release wall portions 150 thereof from contact with the body 108 of foodstuff at appropriate periods of operation to ensure that the foodstuff body can fall by gravity into correct position for subsequent movement into contact with the grater.

When the cheese is cut from the body 108 of cheese by the grater 112, the cheese tends to form relatively long strings 127 having an unsatisfactory appearance. Accordingly, secondary cutters 128 are provided to cut the elongated pieces of cheese into relatively short pieces which are visually appealing.

In yet additional aspects of the present invention the apparatus for slicing pieces of a pepperoni and for associating the sliced pieces with a pastry shell and the apparatus for grating cheese and for associating the grated cheese with a pastry shell are designed to be operated with a continuously moving pastry shell disposed on the conveyor 12. In the preferred embodiment of the invention apparatus is provided apparatus for autmatically assembling pizza pie shells through a plurality of food processing stations. At one of the food processing stations apparatus 18 is provided for severing slices of pepperoni from one or more main bodies of pepperoni and for associating the sliced pieces of pepperoni with the pastry shell while the pastry shell is continuously moving through that food processing station. At another food processing station apparatus 16 is provided for grating cheese from a main body of cheese and for associating the grated cheese with the moving pastry shell as the pastry shell is continuously moving through that food processing station. However, it should be understood that the pepperoni slicing apparatus 18 and cheese grating apparatus 16 could be used separately if desired.

Thus, by virtue of the foregoing description, applicant has described what he believes to be extremely efficient apparatus for depositing various types of foodstuff on a pizza shell. With the foregoing description in mind, many applications of the concepts of the present invention will become readily apparent to those of ordinary skill in the art. Therefore,

What is claimed is:

1. Apparatus comprising first conveyor means for sequentially moving pizza shells along a first path through a first food processing station and through a second food processing station, said first food processing station comprising means for supporting a body of cheese, first cutting means at said first food processing station for cutting elongated pieces of cheese from said body of cheese, second cutting means at said first food processing station for cutting the elongated pieces of cheese into relatively short lengths, means for guiding the short lengths of cheese toward a location at which the short lengths of cheese are associated with a pizza shell as it is moved through said first food processing station under the influence of said first conveyor means, said second food processing station comprising means for supporting a body of pepperoni, blade means for severing pieces of pepperoni from said body of pepperoni, second conveyor means for receiving severed pieces of pepperoni and for moving the severed pieces of pepperoni along a path toward a location at which the severed pieces of pepperoni are associated with a pizza shell as it is moved through said second food processing station under the influence of said first conveyor means, said second conveyor means including surface means movable along at least a portion of said second path for applying a force to the severed pieces of pepperoni to positively move the severed pieces of pepperoni along said second path, said first conveyor means including drive means for effecting continuous operation of said first conveyor means to move pizza shells through said first and second food processing stations at a substantially constant speed, said second conveyor means including means for moving said surface means and the severed pieces of pepperoni disposed thereon in timed relation to the speed that pizza shells are moved through said first and second food processing stations by said first conveyor means.

2. An apparatus as set forth in claim 1 wherein said means for supporting a body of cheese includes means for moving the body of cheese relative to said first cutting means at a speed which is in timed relation to the speed at which pizza shells are moved through said first and second food processing stations by said first conveyor means.

3. An apparatus as set forth in claim 25 including means for moving a body of pepperoni toward said blade means at a speed which is in timed relation to the speed which pizza shells are moved through said first and second food processing stations by said first conveyor means.

4. Apparatus as set forth in claim 1 and further including pressure applicator means for pressing slices of pepperoni against said surface means as the slices of pepperoni are moved by said surface means along said second path, said pressure applicator means comprising a substantially rigid elongated rod member, means for supporting said rod member at a distance from said surface means which is equal to or less than the thickness of a slice of pepperoni.

5. Apparatus as set forth in claim 1 wherein said blade means includes a cutting edge and further includes a blade surface cooperable with said surface means to form a nip therewith for receiving slices of the pepperoni, said cutting edge and said means for supporting said body of pepperoni being cooperable to sever slices having a thickness equal to or greater than the distance between said blade surface and surface means at said nip.

6. Apparatus comprising first conveyor means for sequentially moving pastry shells along a first path extending through a food processing station, blade means at said food processing station, means for supporting a body of foodstuff at said food processing station, means for moving said body of foodstuff toward said blade means from a location spaced from said blade means and into engagement with said blade means to sever slices of the foodstuff from the body of foodstuff, second conveyor means for engaging the body of foodstuff as it is moved toward said blade means from the location spaced apart from said blade means, for receiving slices severed from the body of foodstuff by said blade means, and for moving the slices of the foodstuff away from said blade means along a second path toward a location at which the severed pieces of foodstuff are associated with a pastry shell disposed along said first path on said first conveyor means, said second conveyor means including surface means engageable with a portion of the body of foodstuff during at least a portion of the time the body of foodstuff is being moved toward said blade means, and drive means for moving said surface means toward said blade means at substantially the same speed as said means for supporting the body of foodstuff is moved toward said blade means and while said body of foodstuff is in engagement with said first surface means, said surface means being movable along at least a portion of said second path to apply a force to the slices of foodstuff severed from the body of foodstuff to positively move the slices of foodstuff along said second path away from said blade means.

7. Apparatus as set forth in claim 6 wherein said surface means cooperates with said blade means to define a nip through which the slices of foodstuff pass as they are being severed from the body of foodstuff, said surface means and said blade means being disposed to engage opposite sides of a slice of foodstuff as the slice of foodstuff is severed from said body of foodstuff to guide movement of the slice of foodstuff.

8. Apparatus as set forth in claim 6 wherein said second conveyor means comprises a belt conveyor movable along a continuous path and having a continuous outer surface defining said surface means.

9. Apparatus comprising first conveyor means for sequentially moving pastry shells along a first path extending through a food processing station, blade means at said food processing station, means for supporting a body of foodstuff at said food processing station, means for moving said body of foodstuff toward said blade means from a location spaced from said blade means and into engagement with said blade means to sever slices of the foodstuff from the body of foodstuff, second conveyor means for engaging the body of foodstuff as it is moved toward said blade means from the location spaced apart from said blade means, for receiving slices severed from the body of foodstuff by said blade means, and for moving the slices of the foodstuff away from said blade means along a second path toward a location at which the severed pieces of foodstuff are associated with a pastry shell disposed along said first path on said first conveyor means, said second conveyor means including surface means engageable with a portion of the body of foodstuff during at least a portion of the time the body of foodstuff is being moved toward said blade means, and drive means for moving said surface means toward said blade means at substantially the same speed as said means for supporting the body of foodstuff is moved toward said blade means and while said body of foodstuff is in engagement with said first surface means, said surface means being movable along at least a portion of said second path to apply a force to the slices of foodstuff severed from the body of foodstuff to positively move the slices of foodstuff along said second path away from said blade means, said second conveyor means comprising a belt conveyor movable along a continuous path and having a continuous outer surface defining said surface means, said blade means including a circular cutting edge rotatable about an axis which is disposed in a fixed positional relationship with said second conveyor means, means for guiding said outer surface of said belt conveyor for movement along a path having an arcuate configuration corresponding to the curvature of the circular cutting edge and disposed substantially adjacent the outer periphery of said cutting edge.

10. Apparatus comprising first conveyor means for sequentially moving pastry shells along a first path extending through a food processing station, blade means at said food processing station, means for supporting a body of foodstuff at said food processing station, means for moving said body of foodstuff toward said blade means from a location spaced from said blade means and into engagement with said blade means to sever slices of the foodstuff from the body of foodstuff, second conveyor means for engaging the body of foodstuff as it is moved toward said blade means from the location spaced apart from said blade means, for receiving slices severed from the body of foodstuff by said blade means, and for moving the slices of the foodstuff away from said blade means along a second path toward a location at which the severed pieces of foodstuff are associated with a pastry shell disposed along said first path on said first conveyor means, said second conveyor means including surface means engageable with a portion of the body of foodstuff during at least a portion of the time the body of foodstuff is being moved toward said blade means, and drive means for moving said surface means toward said blade means at substantially the same speed as said means for supporting the body of foodstuff is moved toward said blade means and while said body of foodstuff is in engagement with said first surface means, said surface means being movable along at least a portion of said second path to apply a force to the slices of foodstuff severed from the body of foodstuff to positively move the slices of foodstuff along said second path away from said blade means, said second conveyor means comprising a belt conveyor movable along a continuous path and having a continuous outer surface defining said surface means, means for moving said first conveyor means continuously along said first path, means for moving said belt conveyor continuously along said continuous path and at a speed which varies as a function of variations of the speed at which said first conveyor means is moved along said first path.

11. Apparatus as set forth in claim 10, wherein said blade means includes a cutting edge and further includes a blade surface cooperable with said surface means to form a nip therewith for receiving slices of the foodstuff, said cutting edge and said means for supporting said body of foodstuff being cooperable to sever slices having a thickness equal to or greater than the distance between said blade surface and surface means at said nip.

12. Apparatus comprising first conveyor means for sequentially moving pastry shells along a first path extending through a food processing station, blade means at said food processing station, means for supporting a body of foodstuff at said food processing station, means for moving said body of foodstuff toward said blade means from a location spaced from said blade means and into engagement with said blade means to sever slices of the foodstuff from the body of foodstuff, second conveyor means for engaging the body of foodstuff as it is moved toward said blade means from the location spaced apart from said blade means, for receiving slices severed from the body of foodstuff by said blade means, and for moving the slices of the foodstuff away from said blade means along a second path toward a location at which the severed pieces of foodstuff are associated with a pastry shell disposed along said first path on said first conveyor means, said second conveyor means including surface means engageable with a portion of the body of foodstuff during at least a portion of the time the body of foodstuff is being moved toward said blade means, and drive means for moving said surface means toward said blade means at substantially the same speed as said means for supporting the body of foodstuff is moved toward said blade means and while said body of foodstuff is in engagement with said first surface means, said surface means being movable along at least a portion of said second path to apply a force to the slices of foodstuff severed from the body of foodstuff to positively move the slices of foodstuff along said second path away from said blade means, pressure applicator means for pressing slices of foodstuff against said surface means as the slices of foodstuff are moved by said surface means along said second path, said pressure applicator means comprising a substantially rigid elongated rod member, means for supporting said rod member at a distance from said surface means which is equal to or less than the thickness of a slice of foodstuff.

13. Apparatus as set forth in claim 12, wherein said blade means includes a cutting edge and further includes a blade surface cooperable with said surface means to form a nip therewith for receiving slices of the foodstuff, said cutting edge and said means for supporting said body of foodstuff being cooperable to sever slices having a thickness equal to or greater than the distance between said blade surface and surface means at said nip.

14. Apparatus comprising first conveyor means for sequentially moving pastry shells along a first path extending through a food processing station, blade means at said food processing station, means for supporting a body of foodstuff at said food processing station, means for moving said body of foodstuff toward said blade means from a location spaced from said blade means and into engagement with said blade means to sever slices of the foodstuff from the body of foodstuff, second conveyor means for engaging the body of foodstuff as it is moved toward said blade means from the location spaced apart from said blade means, for receiving slices severed from the body of foodstuff by said blade means, and for moving the slices of the foodstuff away from said blade means along a second path toward a location at which the severed pieces of foodstuff are associated with a pastry shell disposed along said first path on said first conveyor means, said second conveyor means including surface means engageable with a portion of the body of foodstuff during at least a portion of the time the body of foodstuff is being moved toward said blade means, and drive means for moving said surface means toward said blade means at substantially the same speed as said means for supporting the body of foodstuff is moved toward said blade means and while said body of foodstuff is in engagement with said first surface means, said surface means being movable along at least a portion of said second path to apply a force to the slices of foodstuff severed from the body of foodstuff to positively move the slices of foodstuff along said second path away from said blade means, said means for supporting a body of foodstuff including a carriage, said carriage including means for supporting a plurality of elongated bodies of pepperoni, means for moving said carriage in a first direction to bring said elongated bodies of pepperoni into engagement with said blade means to sever pieces of pepperoni from a plurality of said elongated bodies, said second conveyor means including a plurality of belt conveyors movable along respective continuous paths, said surface means being disposed in said plurality of belt conveyors each of the bodies of pepperoni being disposed in engagement with one of said belt conveyors during at least a portion of the movement of the body of pepperoni by said carriage.

15. An apparatus comprising main conveyor means for sequentially moving pastry shells along a main path extending through a food processing station, a carriage at said food processing station and including means for supporting a body of foodstuff, first cutting means at said food processing station, means for moving said carriage in a first direction relative to said first cutting means to bring said body of foodstuff into engagement with a first portion of said first cutting means for cutting elongated pieces from the body of foodstuff, means for moving said carriage in a second direction relative to said first cutting means for bringing said body of foodstuff into engagement with a second portion of said first cutting means for cutting elongated pieces from the body of foodstuff, second cutting means at said food processing station for cutting elongated pieces of foodstuff produced by engagement of said body of foodstuff with either of said first or second portions of said first cutter means into relatively short lengths of foodstuff, and means for guiding the short lengths of foodstuff toward a location at which the short lengths of foodstuff are associated with a pastry shell as it is moved through said food processing station under the influence of said main conveyor means, said first and second portions of said first cutting means each including a plurality of fixed cutting edges and said second cutting means includes a plurality of movable cutting edges disposed to engage severed elongated pieces of foodstuff from said fixed cutting edges to sever the elongated pieces of foodstuff into relatively short lengths of foodstuff, means for rotating at least certain ones of said moveable cutting edges in response to movement of said carriage in said first direction and means for rotating at least certain other ones of said moveable cutting edges in response to movement of the carriage in said second direction.

16. Apparatus as defined in claim 15 wherein said carriage means includes wall portions normally engaging and substantially coextensive with respective side surfaces of said body of foodstuff, said wall portions including at least two wall portions movable relative to each other between a disengaged condition in which said wall portions are ineffective to support the body of foodstuff and an engaged condition in which said wall portions are effective to support the body of foodstuff, said means for moving said carriage in a first direction including means for moving said carriage from a first position to a second position and means for stopping said carriage at said second position, said means for moving said carriage in a second direction including means for moving said carriage from said second position to said first position and means for stopping said carriage means at said first position, means responsive to the stopping of said carriage at said first or second position for effecting relative movement of said wall portions from the engaged condition to the disengaged condition in which said wall portions are spaced from side surfaces of the body of foodstuff and for thereafter moving said wall portions back into engagement with said side surfaces for reducing the area of wall contact against the side surfaces of said body of foodstuff for a period of time while said carriage is in said first or second position.

17. An apparatus as set forth in claim 15 wherein said carriage means is moveable in said first and second directions along a single path, said first and second cutting portions each including blade portions intersecting said single path, secondary conveyor means having first and second surface means movable along the single path at substantially the same speed as said carriage means, said first and second surface means disposed for respective engagement with a portion of the body of foodstuff as the carriage means moves the body of foodstuff along respective selected portions of the secondary path.

18. Apparatus as set forth in claim 17 wherein said main conveyor means comprises a continuous belt conveyor, and wherein said secondary conveyor means comprises first and second spaced continuous belt conveyors, said first and second belt conveyors having predetermined portions of their runs disposed along said single path, said first cutting means being disposed between said first and second continuous belt conveyors.

19. Apparatus as set forth by claim 15 wherein a plurality of said movable cutting edges are supported by a first rotatably mounted axle and a second plurality of said moveable cutting edges are supported by a second rotatably mounted axle, each of said first and second axles having respective first and second pinion gears fixedly mounted thereto, a rack gear fixedly connected with said carriage means and disposed so as to engage said first pinion gear to rotate said first axle as said carriage means moves a body of foodstuff in a first direction into engagement with said fixed cutting edges and to engage said second pinion gear to rotate said second axle as said carriage moves a body of foodstuff in a second direction into engagement with said fixed cutting edge.

* * * * *